US006190263B1

(12) United States Patent
Kimoto et al.

(10) Patent No.: US 6,190,263 B1
(45) Date of Patent: Feb. 20, 2001

(54) PROPELLER SHAFT INCLUDING COMPRESSIVE LOAD TRANSMITTING SECTION

(75) Inventors: Yukitane Kimoto; Yasuyuki Toyoda, both of Matsuyama; Yutaka Ochi, Ehime-ken, all of (JP)

(73) Assignee: Toray Industries, Inc., Tokyo (JP)

( * ) Notice: Under 35 U.S.C. 154(b), the term of this patent shall be extended for 0 days.

(21) Appl. No.: 09/426,718

(22) Filed: Oct. 26, 1999

Related U.S. Application Data

(63) Continuation of application No. 08/967,368, filed on Nov. 7, 1997, now abandoned, which is a continuation of application No. 08/495,543, filed on Jul. 28, 1995, now abandoned.

(30) Foreign Application Priority Data

Nov. 30, 1993 (JP) ........................................ 5-300312
Nov. 30, 1993 (JP) ........................................ 5-300313

(51) Int. Cl.[7] .............................................. F16C 3/00
(52) U.S. Cl. ........................................ 464/181; 464/182
(58) Field of Search ................................ 464/181, 182, 464/183, 134; 403/265

(56) References Cited

U.S. PATENT DOCUMENTS 4,932,924 * 6/1990 Lobel ........................................ 464/181
5,222,915 * 6/1993 Petrzelka et al. .................... 464/181
5,976,021 * 11/1999 Stark et al. ...................... 464/183 X

* cited by examiner

*Primary Examiner*—Lynne H. Browne
*Assistant Examiner*—Greg Binda
(74) *Attorney, Agent, or Firm*—Morrison & Foerster LLP

(57) ABSTRACT

A propeller shaft for automobiles includes a cylindrical main body 1 made of FRP and joints 2 that are joined to the ends of this main body by press fitting, the main body 1 having a main layer 1*a* extending over the entire length thereof and including reinforcing fibers helically wound at an angle of ±5~30° with respect to the axial dimension of the main body, and sub-layers 1*b* formed at the ends of the main body so as to be integral with and internally of the main layer 1*a* and including hooped reinforcing fibers. Each joint 2 has a slope 2*c* descending toward the joint surface between this joint and the main body 1, an erect surface 2*d* having an outer diameter not larger than the outer diameter of the sub-layers 1*b* and abutting the end surface of the associated sub-layer 1*b*, or a wedge 2*f* the tip of which is opposed to the interface between the main layer 1*a* and the associated sub-layer 1*b*. When an axial compressive load is applied to the joints 2, the slopes 2*c*, the erect surfaces 2*d* or the wedges 2*f* cause the main layer 1*a* and the sub-layers 1*b* to be separated from each other to cause rupture of the main body to proceed, thereby enabling the energy absorbing effect due to a crashable body structure to be realized.

13 Claims, 12 Drawing Sheets

PROPELLER SHAFT INCLUDING COMPRESSIVE LOAD TRANSMITTING SECTION

This application is a continuation application of U.S. Ser. No. 08/967,368, filed Nov. 7, 1997, now abandoned, which is a continuation of U.S. Ser. No. 08/495,543, filed Jul. 28, 1995, now abandoned.

TECHNICAL FIELD

This invention relates to a propeller shaft (drive shaft) for automobiles and the like.

BACKGROUND ART

Nowadays, there is a great demand for weight reduction in automobiles from the viewpoint of fuel economy, environmental protection, etc. As a means for achieving this, use of propeller shafts formed of FRP (fiber-reinforced plastics) are being considered, and some of them have already been put into practical use. Such an FRP propeller shaft has a cylindrical main body that is made of FRP, and metal joints that are joined to the ends of this main body.

An automobile propeller shaft, which serves to transmit torque generated in the engine to driving wheels, is required to have a torsional strength of approximately 100~400 kgf.m. Further, it is also required to have a critical revolution of approximately 5,000 to 15,000 rpm in order that resonance may be avoided in high-speed rotation. To satisfy these fundamental requirements, various parameters, such as the kind, quantity and orientation of reinforcing fibers, the layered structure, the outer and inner diameters, and the wall thickness, are taken into consideration when designing the main body, which is made of FRP.

For example, in determining the orientation of the reinforcing fibers, the following facts are to be taken into account: mainly from the viewpoint of torsional strength, the reinforcing fibers are most effectively arranged at an angle of ±45° with respect to the axial dimension of the main body. Mainly from the viewpoint of torsional buckling strength, the most effective angle of arrangement for the reinforcing fibers is ±80~90° with respect to the axial dimension of the main body. Mainly from the viewpoint of critical revolution, the reinforcing fibers are to be arranged in a direction as close as possible to the axial direction in order to achieve an increase in bending elasticity modulus to thereby obtain a high bending resonance frequency.

Thus, the most effective orientation for the reinforcing depends upon the fundamental requirement to be taken into consideration, such as torsional strength or critical revolution, which means the layer structure has to be determined by appropriately combining orientations that are most suitable from the viewpoint of the actual requirements. The torsional strength can also be dealt with in terms of dimensions, such as outer diameter and wall thickness, so that, when designing a propeller shaft, first priority is usually given to the critical revolution, which greatly depends upon the orientation of the reinforcing fibers, and the proportion of those layers in which the reinforcing fibers are arranged at a small angle with respect to the axis of the shaft is made relatively large. This, however, entails the following problems:

The assurance of safety for the passengers when a collision occurs is an issue no less important than weight reduction. The prevailing present-day idea in automobile design regarding safety assurance consists in a crashable body structure, in which the impact energy (compressive load) at the time of collision is absorbed by the compressive destruction of the body, thereby mitigating the rapid acceleration applied to the passengers. It should be noted, however, that, if the body of the FRP propeller shaft is designed in conformity with the above idea, which gives priority to critical revolution, the strength of the body with respect to an axial compressive load must inevitably increase. This leads to a deterioration in the impact energy absorbing effect. Thus, when the body suffers rupture as a result of a collision and the rupture proceeds to reach the propeller shaft, the propeller shaft will act as a kind of prop.

As a means for solving this problem, Japanese Patent Laid-Open No. 3-37416 proposes a propeller shaft in which the joints are allowed to move axially along the joint surfaces between the main body and these joints, and, in this process, the joints force the main body to gradually enlarge until its rupture, starting from the ends thereof, thereby breaking the propeller shaft. However, in this conventional propeller shaft, it is necessary for the main body and the joints to be joined together through the intermediation of teeth of a complicated shape, a separating agent, etc., in order to secure the movement of the joints, resulting in a rather complicated structure. Furthermore, a complicated production process is not avoided. Moreover, when, in a propeller shaft having such a construction, joints are to be joined by press fitting, the main body must be strong enough to withstand the force applied in the press fitting process. However, imparting such a high strength to the main body makes it difficult for the main body to be enlarged and broken by the compressive load. Thus, it is quite difficult simultaneously to satisfy the above-mentioned fundamental requirements and the requirements regarding enlargement and rupture, which are contradictory to each other.

Japanese Patent Laid-Open No. 4-339022 discloses a propeller shaft in which, when an axial compressive load is applied, the joints are caused to move along the joint surfaces between the main body and these joints toward the interior of the main body, whereby the impact energy is absorbed by the movement resistance. However, in such a construction, it is absolutely necessary for the outer diameter of the joints to be smaller than the inner diameter of the main body, resulting in a reduction in the degree of freedom in designing. Furthermore, the amount of movement is limited to the length of the joints, so that the effect of absorbing the impact energy is not so great.

Thus, the conventional propeller shafts can not be regarded as well balanced in terms of fundamental requirements regarding torsional strength, critical revolution, etc. and safety assurance for the passengers at the time of a collision.

DISCLOSURE OF THE INVENTION

It is an object of this invention to provide a propeller shaft in which the above problems in the conventional propeller shafts have been solved and which, when the automobile undergoes a crash, reliably causes rupture to proceed in the propeller shaft with the breakage of the car body, thereby making it possible for the energy absorbing effect of the car body to be fully exerted.

To achieve the above object, there is provided, in accordance with the present invention, a propeller shaft comprising a cylindrical main body made of FRP and a joint that is joined to an end of this main body, the main body including a main layer extending over the entire length thereof and a sub-layer formed at the end of the main body so as to be integral with and internally of the main layer, the joint being equipped with a compressive load transmitting section adapted to concentrate a compressive load axially applied to the joint on the interface between the main layer and the sub-layer to thereby separate the main layer and the sub-layer from each other at this interface.

In accordance with this invention, there is further provided a propeller shaft comprising a cylindrical main body made of FRP and joints that are joined to one and the other end of this main body, the main body including a main layer extending over the entire length thereof and a sub-layer formed at one end of the main body so as to be integral with and internally of the main layer, the joint provided at the above-mentioned one end being equipped with a compressive load transmitting section adapted to concentrate a compressive load acting in the axial direction of this joint on the interface between the main layer and the sub-layer to thereby separate the main layer and the sub-layers from each other at this interface.

This invention further provides a propeller shaft comprising a cylindrical main body made of FRP and joints that are joined to one and the other end of this main body, the main body including a main layer extending over the entire length thereof and including helically wound reinforcing fibers, and sub-layers formed at one and the other end of the main body so as to be integral with and internally of the main layer and including hooped reinforcing fibers, the joints provided at one and the other end each being equipped with a compressive load transmitting section adapted to concentrate a compressive load acting in the axial direction of the joint on the interface between the main layer and the sub-layer to thereby separate the main layer and the sub-layer from each other at this interface.

In accordance with this invention, there is further provided a propeller shaft comprising a cylindrical main body made of FRP and joints that are respectively joined to one and the other end of this main body, the main body including a main layer extending over the entire length thereof and including reinforcing fibers helically wound at an angle of ±5~30° with respect to the axial dimension of the main body, and sub-layers formed at one and the other end of the main body so as to be integral with and situated internally of the main layer and including hooped reinforcing fibers, the joints provided at one and the other end of the main body being each equipped with a compressive load transmitting section adapted to concentrate a compressive load acting in the axial direction of the joint on the interface between the main layer and the sub-layer to thereby separate the main layer and the sub-layer from each other at this interface.

In the above constructions, it is desirable for the compressive load transmitting section to have a slope descending toward the joint surface between the joint and the main body or an erect surface having an outer diameter not larger than the outer diameter of the sub-layer and opposed to the outer end surface of the sub-layer. When the erect surface construction is adopted, it is possible for the erect surface to be continuous in the circumferential direction of the joint or divided into a plurality of parts. In the case of the former structure, it would be desirable to partially beveled the outer end surface of the main body.

Further, to achieve the above object, this invention provides a propeller shaft comprising a cylindrical main body made of FRP and metal joints that are joined to one and the other end of this main body, the main body including:

a. a main layer provided to extend over the entire length of the main body and including reinforcing fibers helically wound at an angle of ±5–30° with respect to the axial dimension of the main body; and b. sub-layers formed at one and the other end of the main body so as to be integral with and internally of the main layer and including hooped reinforcing fibers, the joints provided at one and the other end of the main body including:

c. joint surfaces in contact with the inner periphery of the sub-layers; and d. compressive load transmitting sections provided adjacent to the joint surfaces, each adapted to concentrate a compressive load acting in the axial direction of the joints on the interface between the main layer and the sub-layer to thereby separate the main layer and the sub-layer from each other at this interface, and each having a slope descending toward the joint surface.

In accordance with this invention, there is further provided a propeller shaft comprising a cylindrical main body made of FRP and metal joints that are joined to one and the other end of this main body, the main body including:

a. a main layer provided to extend over the entire length of the main body and including reinforcing fibers helically wound at an angle of ±5~30° with respect to the axial dimension of the main body; and b. sub-layers formed at one and the other end of the main body so as to be integral with and internally of the main layer and including hooped reinforcing fibers, the joints provided at one and the other end of the main body including:

c. joint surfaces in contact with the inner periphery of the sub-layers; and d. compressive load transmitting sections provided adjacent to the joint surfaces, each adapted to concentrate a compressive load acting in the axial direction of the joints on the interface between the main layer and the sub-layer to thereby separate the main layer and the sub-layer from each other at this interface, and having erect surfaces having an outer diameter that is not larger than the outer diameter of the sub-layers and opposed to the outer end surfaces of the sub-layers. In this case also, the erect surfaces may extend in a ring-like fashion in the circumferential direction of the joints, or a plurality of erect surfaces may be arranged circumferentially. In the former case, it is desirable for the outer end surfaces of the main body be partially beveled beforehand.

Further, to achieve the above object, this invention provides a propeller shaft comprising a cylindrical main body made of FRP and a joint that is joined to an end of this main body, the main body including a main layer extending over the entire length thereof and a sub-layer formed at the end of the main body so as to be integral with and situated internally of the main layer, the joint being equipped with wedge means for causing a compressive load acting in the axial direction of the joint to act on the interface between the main layer and the sub-layer to thereby separate the main layer and the sub-layer from each other.

This invention further provides a propeller shaft comprising a cylindrical main body made of FRP and joints that are joined to one and the other end of this main body, the main body including a main layer extending over the entire length thereof and a sub-layer formed at one end of the main body so as to be integral with and internally of the main layer, the joint provided at the above-mentioned one end being equipped with wedge means for causing a compressive load acting in the axial direction of the joint to act on the interface between the main layer and the sub-layer to thereby separate the main layer and the sub-layer from each other.

Further, this invention provides a propeller shaft comprising a cylindrical main body made of FRP and joints that are joined to one and the other end of the main body, the main body including a main layer extending over the entire length thereof and including reinforcing fibers helically wound and sub-layers formed at one and the other end of the main body so as to be integral with and internally of the main layer and including hooped reinforcing fibers, the joints provided at one and the other end mentioned above being equipped with wedge means adapted to cause a compressive load acting in the axial direction of the joints to act on the interface between the main layer and the sub-layers to thereby separate the main layer and the sub-layer from each other.

Further, this invention provides a propeller shaft comprising a cylindrical main body made of FRP and joints that are joined to one and the other end of the main body, the main body including a main layer extending over the entire length thereof and including reinforcing fibers helically wound at an angle of ±5~30° with respect to the axial dimension of the main body, and sub-layers formed at one and the other end of the main body so as to be integral with and internally of the main layer and including hooped reinforcing fibers, the joints provided at one and the other end mentioned above being equipped with wedge means adapted to cause a compressive load acting in the axial direction of the joints to act on the interface between the main layer and the sub-layers to thereby separate the main layer and the sub-layer from each other.

In accordance with this invention, there is further provided a propeller shaft comprising a cylindrical main body made of FRP and metal joints that are joined to one and the other end of this main body, the main body including:

a. a main layer provided to extend over the entire length of the main body and including reinforcing fibers helically wound at an angle of ±5~30° with respect to the axial dimension of the main body; and b. sub-layers formed at one and the other end of the main body so as to be integral with and internally of the main layer and including hooped reinforcing fibers, the joints provided at one and the other end of the main body including:

c. joint surfaces in contact with the inner periphery of the sub-layers; and d. wedge means provided adjacent to the joint surfaces, each adapted to concentrate a compressive load acting in the axial direction of the joints on the interface between the main layer and the sub-layer to thereby separate the main layer and the sub-layer from each other at this interface, and having forward ends opposed to the interface between the main layer and the sub-layers.

The above-mentioned wedge means has a ring-like wedge extending along the interface between the main layer and the sublayer, or a plurality of wedges arranged along the interface.

In the above constructions, it is desirable for the junction between the main body and the joints to be effected by press fitting. It is desirable for the joints to have a serration extending in the axial direction thereof on the joint surface between the joints and the main body. Further, it is desirable for the main body to contain a damper.

BEST MODE FOR CARRYING OUT THE INVENTION

Figure 1:
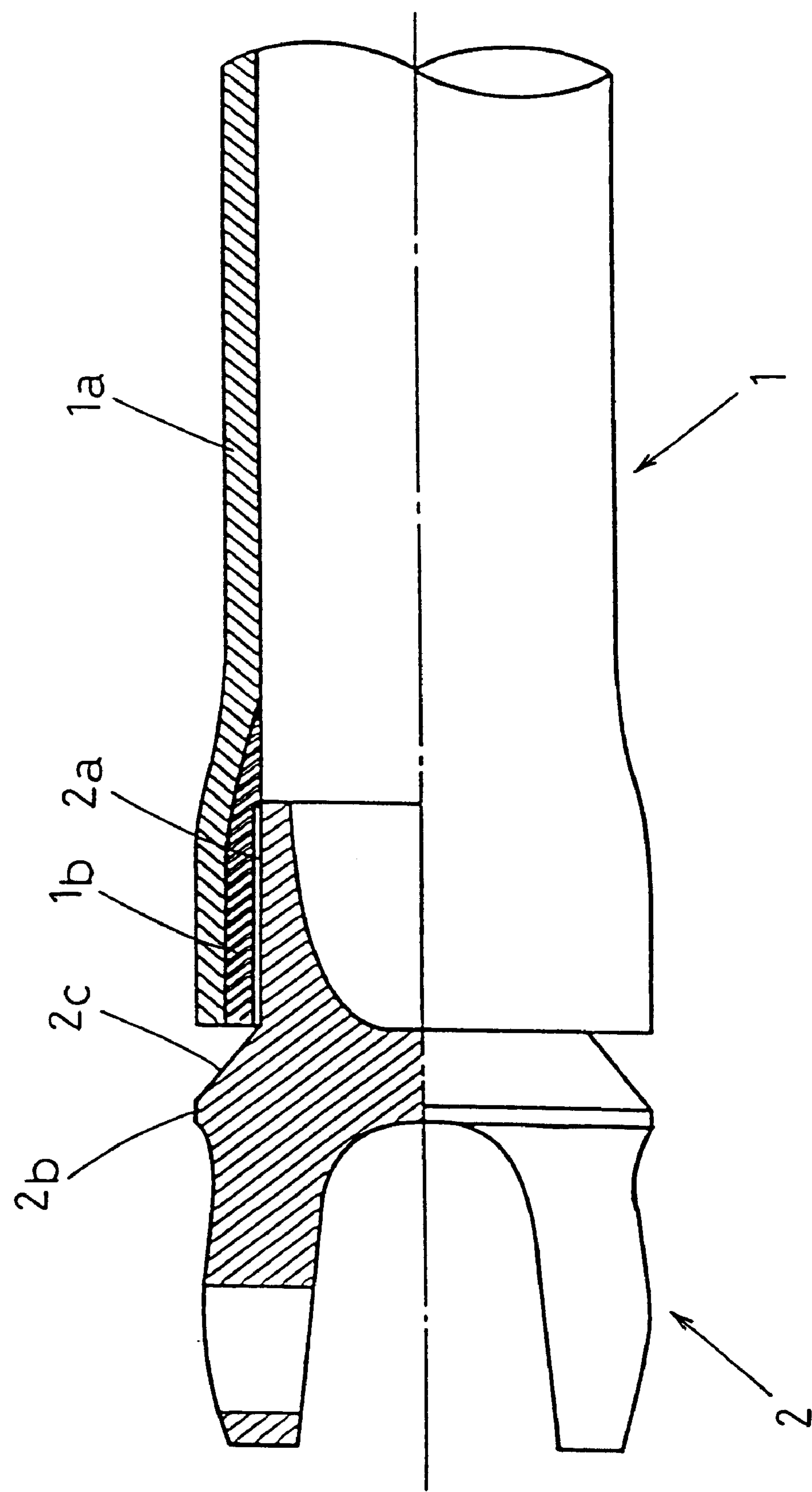
FIG. 1A is a schematic front view, partly in longitudinal section, showing the essential part of a propeller shaft according to an embodiment of the present invention having a joint at one end of the propeller shaft.
FIG. 1B is a schematic front view, partially in longitudinal section, showing the essential part of a propeller shaft of the embodiment of FIG. 1A having joints at each end of the propeller shaft.

This invention will now be described in more detail with reference to an embodiment thereof. FIGS. 1A and 1B show a propeller shaft having a cylindrical main body 1 formed of FRP, which is obtained by reinforcing a thermosetting resin, such as epoxy resin, unsaturated polyester resin, phenol resin, vinyl ester resin or polyimide resin, or a thermoplastic resin, such as polyamide resin, polycarbonate resin, or polyether imide resin, by means of reinforcing fibers of high strength and high elastic modulus, such as carbon fibers, glass fibers, or polyaramid fibers. As shown in FIG. 1B, metal joints are joined to one and the other end of the main body 1 by press fitting. This propeller shaft is symmetrical about the midpoint thereof with respect to the longitudinal direction.

The main body 1 has a main layer 1*a* having a uniform inner diameter, extending over the entire length thereof, and including reinforcing fibers helically wound at an angle of ±5~30° with respect to the axial dimension, and sub-layers (layers in which reinforcing fibers are arranged at an angle of ±80~90° with respect to the axial dimension) 1*b* formed at the ends of the main body 1 so as to be integral with and internally of the main layer 1*a* and including hooped reinforcing fibers. The main layer la mainly serves to improve the bending elastic modulus in the axial direction of the main body 1 to thereby enhance the flexural resonance frequency, critical revolution, and torsional strength of the propeller shaft. The sub-layers 1*b* mainly serve to impart to the ends of the main body 1, to which the joints are joined by press fitting, a strength large enough to withstand the force applied at the time of press fitting without preventing the progress of rupture as described below, and transmit the torque (torsional torque) from the joints 2 to the main body 1. The main body 1 can be formed, for example, by the filament winding method.

That is, a bundle of reinforcing fibers impregnated with resin is hooped around one end of a mandrel to form a sub-layer to a desired thickness and in a desired length, and then the bundle of reinforcing fibers impregnated with resin is passed as it is to the other end of the mandrel to form a sub-layer at the other end in a similar manner. Subsequently, a bundle of fibers impregnated with resin is helically wound while reciprocating the bundle of layers impregnated with resin between one and the other end to thereby form a main layer having a desired thickness. When the formation of the main layer has been completed, it is possible to hoop one layer of a bundle of fibers impregnated with resin around the main layer, whereby surplus resin is squeezed out to increase the volume content of the reinforcing fibers, thereby further improving various kinds of strengths, elastic modulus, etc. of the main body. In this way, it is possible to form the layers continuously without cutting the bundle of reinforcing fibers in mid course. After the formation of the layers, the resin is cured or solidified, preferably rotating them the while. Then, the mandrel is drawn out to thereby obtain the main body.

Each joint 2 is in contact with the inner side of the sub-layer 1*b*, and has a joint surface 2*a* that is somewhat shorter than the associated sub-layer 1*b*. The outer diameter of that section of the joint where the joint surface 2*a* is formed is slightly larger than the inner diameter of the main body 1 before press fitting. Thus, when the joint 2 is forced into the main body 1, a compressive stress is applied to the joint surface 2*a* of the joint, and a circumferential tensile stress is applied to the main body. Due to the compressive stress and the tensile stress, the main body 1 and the joint 2 are firmly joined together. At each end of the main body 1, the sub-layer 1*b* exists internally, and the main layer 1*a* on the outer side, so that the circumferential tensile strength generated in the main body 1 as a result of the press fitting is mainly borne by the sub-layer 1*b*. The distortion of the main body 1 is largest on the inner periphery and diminishes toward the outer periphery. However, due to the hooped reinforcing fibers, the sub-layer, which is situated internally of the main layer 1*a* has a relatively large tensile rupture ductility, while the main layer 1*a* has a relatively small rupture ductility, with the result that an effective joint condition is realized.

Figure 2:
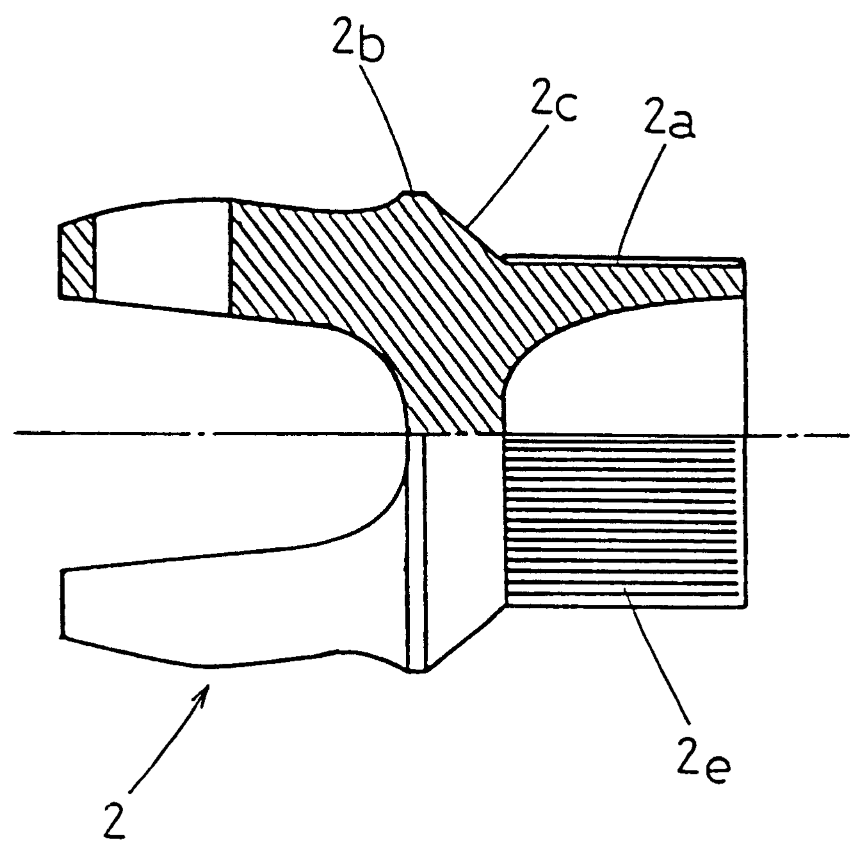
FIG. 2 is a schematic front view, partly in longitudinal section, showing a joint used in the propeller shaft shown in FIGS. 1A and 1B.

The larger the difference between the outer diameter of that section of the joint 2 where the joint surface 2*a* is formed and the inner diameter of the main body 1 before junction, i.e., the press fitting margin, the larger the joining force to be obtained, and the more improved the torsional strength. Thus, the larger this difference, the more convenient it is from the viewpoint of the transmission of torque. The joining force, however, also varies with the area, surface condition, etc. of the joint surface 2*a*. Usually, the ratio of the press fitting margin to the inner diameter of-the main body 1 is determined within the range of 0.001–0.02, and the length of the joint surface 2*a* as measured along the axial direction of the main body 1 is set to be not smaller than 1/10 of the inner diameter of the main body 1. Further, as shown in FIG. 2, it would be very convenient to provide a serration 2*e* extending along the axial dimension of the joint. Apart from this, it would also be expedient to enhance the joining force, facilitate the press fitting through improvement of slip, fill the gap between the joint surface 2*a* and the inner surface of the sub-layer 1*b*, or apply adhesive to the joint surface 2*a* for the purpose of protecting the joint surface 2*a* from the atmospheric air.

The above-mentioned joint 2 includes a ring-like protrusion 2*b* whose outer diameter is somewhat larger than the inner diameter of the main body 1, and a slope 2*c* descending from this protrusion 2*b* toward the joint surface 2*a*. The protrusion 2*b* and the slope 2*c* constitute a compressive load transmitting section which concentrates a compressive load acting in the axial direction of the joint 2 on the interface between the main layer 2*a* and the sub-layer 1*b* to thereby separate the main layer 1*a* and the sub-layer 1*b* from each other. It is desirable for the angle which the slope 2*c* makes with the main body 1 to be in the range of 15~45°.

When an axial compressive load is applied to the propeller shaft described above, the joint 2 is pressed against the main body 1 to thereby forcibly enlarge the main body 1 under the action of the slope 2*c* of the protrusion 2*b*, thereby generating a circumferential tensile strain. Then, while the sublayer 1*b*, which is situated internally, remains unbroken due to its high tensile rupture ductility, the main layer 1*a*, which is situated externally, suffers rupture due to its relatively low tensile rupture ductility. This rupture causes inter-layer exfoliatioh between the main layer 1*a* and the sub-layer 1*b*. That is, the main layer 1*a* and the sub-layer 1*b* are separated from each other. From this stage onward, the rupture proceeds rapidly. However, the sub-layer 1*b*, which is joined to the joint 2, does not suffer rupture but moves axially through the main body 1 while destroying the main layer 1*a* with the joint 2 as it moves along.

In this way, the axial energy is absorbed through the rupture of the main layer 1*a*. The initial rupture of the main body 1 is induced by the slope 2*c* of the joint 2, and the protrusion 2*b* forcibly enlarges the main layer 1*a*. In view of this, it is desirable for the angle which the slope 2*c* makes with respect to the axial dimension of the main body 1 to be in the range of 15~45°, as stated above.

Figure 4:
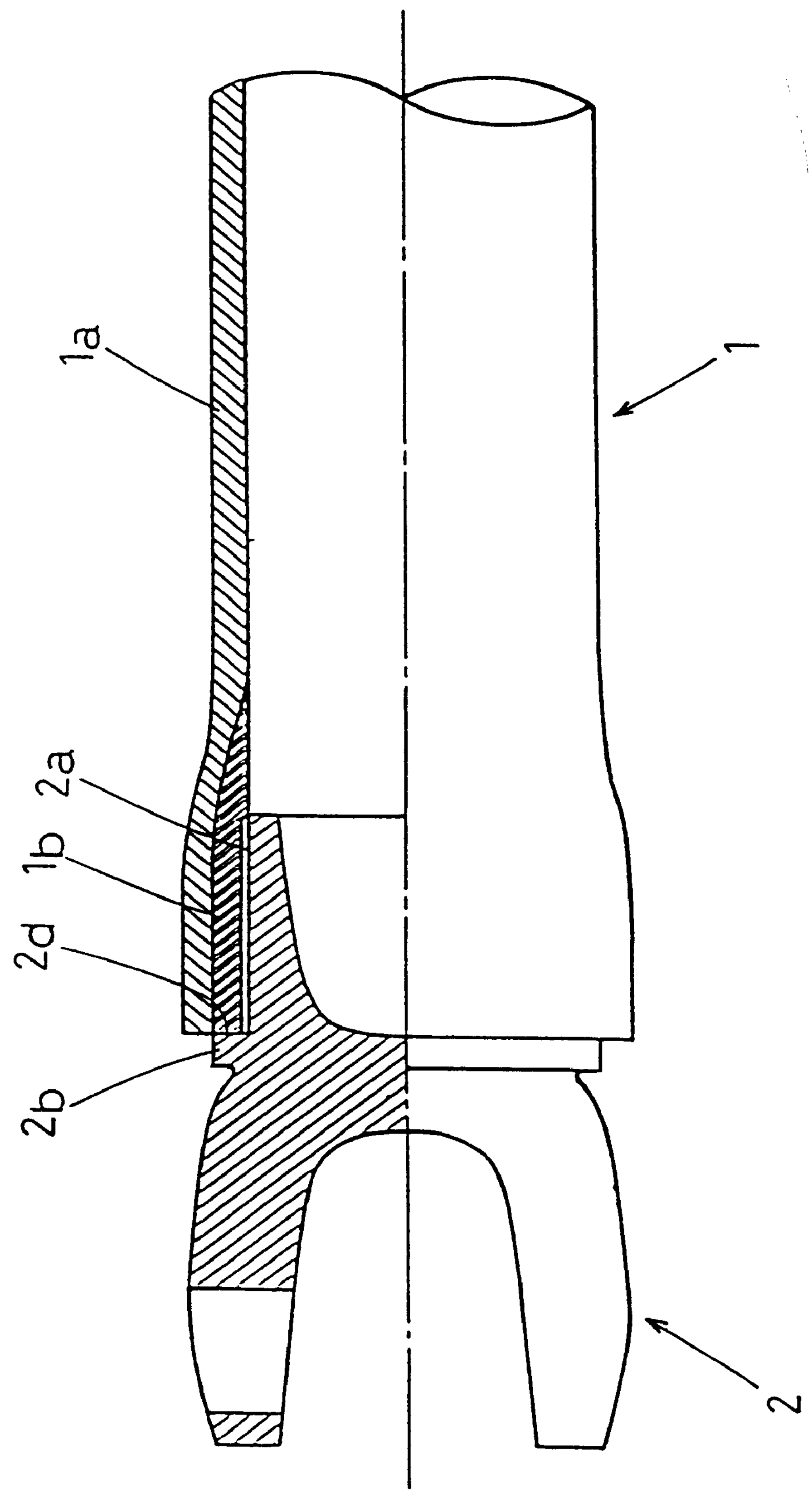
FIG. 4 is a schematic front view, partly in longitudinal section, showing the essential part of a propeller shaft according to another embodiment of the present invention.
Figure 5:
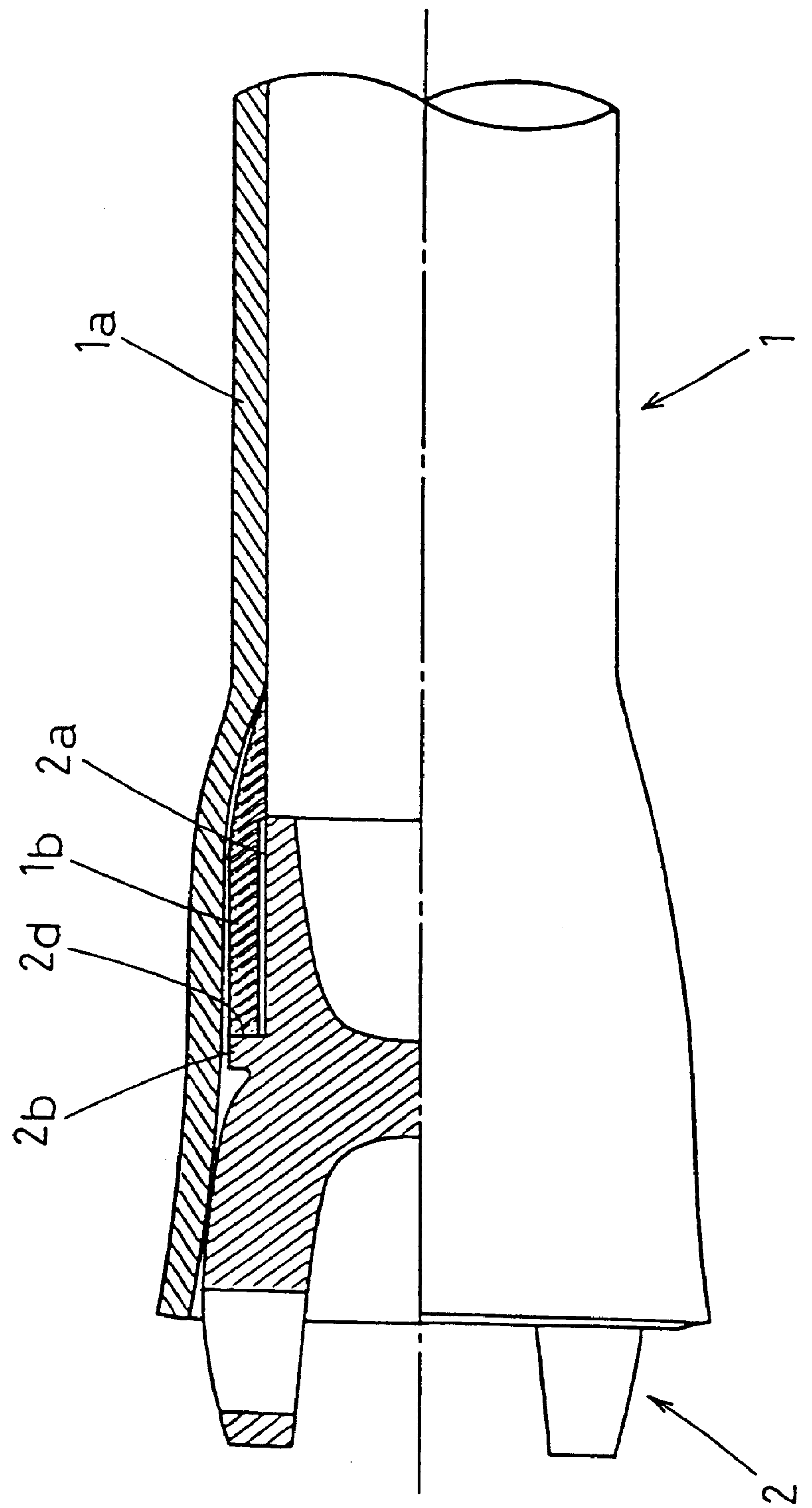
FIG. 5 is a schematic front view, partly in longitudinal section, of the essential part of the propeller shaft shown in FIG. 4, showing how rupture proceeds in the propeller shaft.

FIG. 4 shows a propeller shaft according to another embodiment of this invention. In this embodiment, what corresponds to the slope 2*c* of the ring-like protrusion 2*b*, shown in FIG. 1, provides an erect surface 2*d* that is opposed to the outer axial end surface of the sub-layer 1*b*. The outer diameter of the protrusion 2*b* is equal to that of the sub-layer 1*b*. In this propeller shaft, in which the protrusion 2*b* and the erect surface 2*d* constitute the compressive load transmitting section, a compressive load acting in the axial direction is transmitted to the sub-layer 1*b* from the erect surface 2*d*, which is opposed thereto, and further transmitted to the main layer 1*a*. Therefore, although the main layer 1*a* undergoes compressive deformation, a shearing stress which would destroy the interface between the two layers acts on this interface due to the large difference in Poisson's ratio between the main layer 1*a* and the sub-layer 1*b*. This stress, with the shearing stress generated between the layers by the compressive load and the tensile stress generated by the press fitting of the joint 2, generates a two-directional stress condition, under which the interface ruptures, and, from this stage onward, the rupture of the main layer 1*a* proceeds as shown in FIG. 5. However, this embodiment differs from the above-described one in that it is the sub-layer 1*b* that moves while forcibly enlarging the main layer 1*a*, and the protrusion 2*b*' does not contribute to this forcible enlargement. The same effect is to be achieved by making the outer diameter of the protrusion 2*b*' smaller than that of the sub-layer 1*b*. The erect surface 2*d* may or may not abut the outer axial end surface of the sub-layer 1*b*.

Figure 6A:
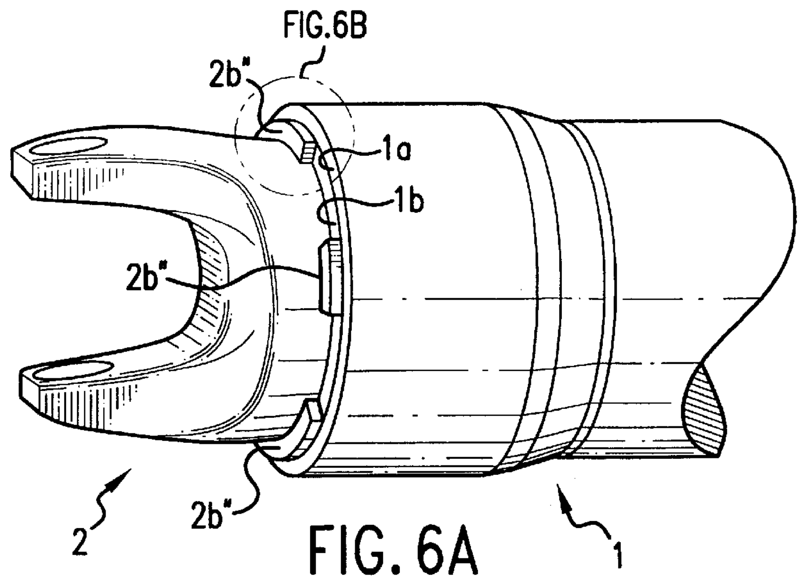
FIG. 6A is a schematic perspective view showing the essential part of a propeller shaft having a joint different from that shown in FIG. 2.
Figure 6B:
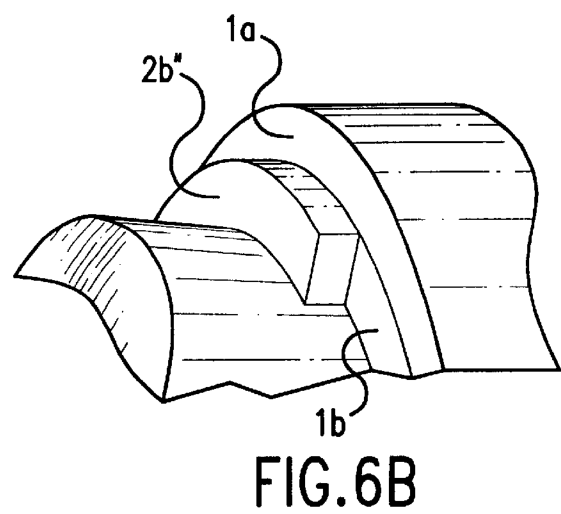
FIG. 6B is an expanded view of FIG. 6A showing the wedge structure.
Figure 7:
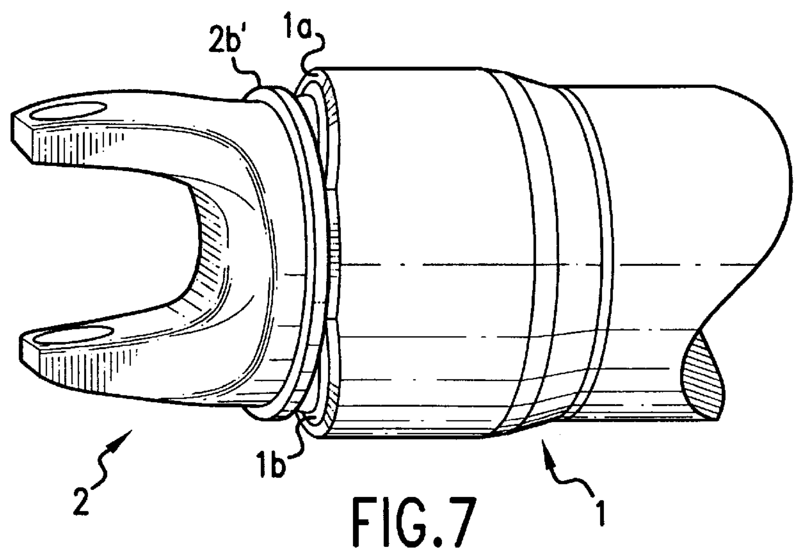
FIG. 7 is a schematic front view showing the essential part of a propeller shaft having a main body configuration different from that shown in FIG. 4.

In the embodiment shown in FIGS. 4 and 5, it is also possible, as shown in FIGS. 6A and 6B, for the protrusion 2*b*" to consist of 1*a* plurality of protrusions arranged circumferentially on the joint 2 to form a ring-like configuration as a whole. Furthermore, as shown in FIG. 7, it is also possible to partially bevel the outer end surface of the main body, opposed to the protrusion 2*b*'. This localizes the stress that is applied to the sub-layer 1*b* when the axial compressive load is applied to the joint 2 in the axial direction thereof. Furthermore, the shearing stress acting on the interface between the main layer la and the sub-layer 1*b* is also localized, with the result that the inter-layer exfoliation or rupture is brought about and caused to proceed more reliably. Further, this leads to an increase in the degree of freedom with respect to the starting load for causing the exfoliation or rupture.

Figure 8:
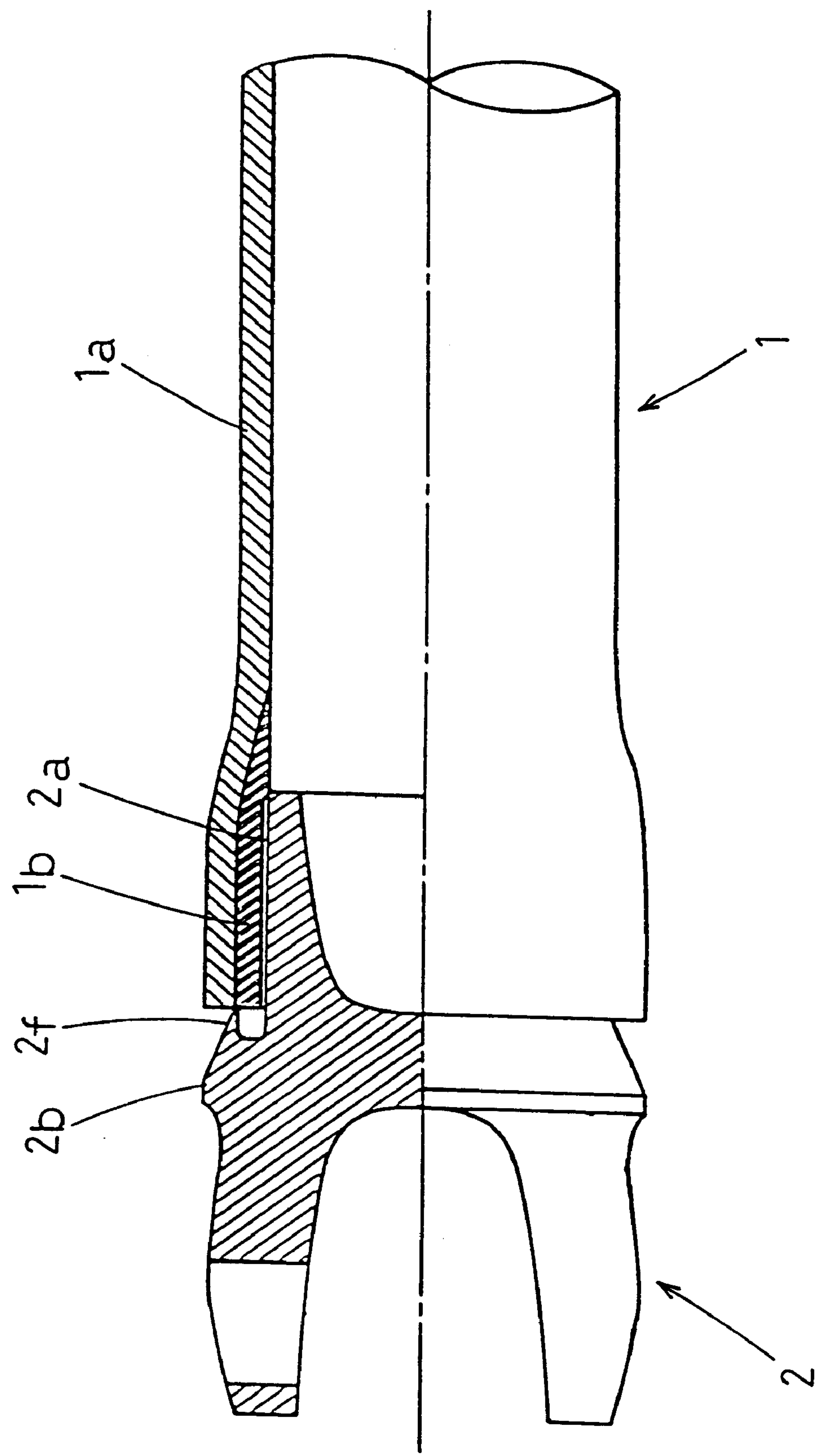
FIG. 8 is a schematic front view, partly in longitudinal section, showing the essential part of a propeller shaft according to still another embodiment of the present invention.
Figure 9:
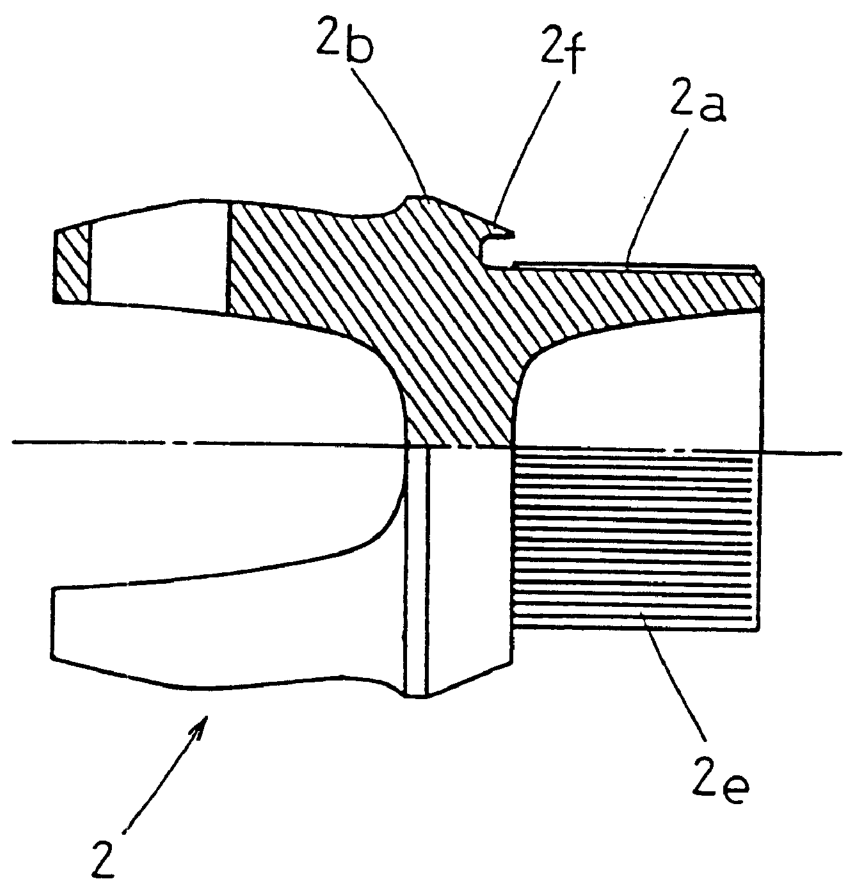
FIG. 9 is a schematic front view, partly in longitudinal section, showing a joint used in the propeller shaft shown in FIG. 8.

FIGS. 8 and 9 show a propeller shaft according to still another embodiment of this invention. In this embodiment, the main body 1 is formed as a component that is perfectly identical with that of the above-described embodiments, whereas the construction of the compressive load transmitting section of the joint 2 differs from those in the above embodiments.

The joint 2 has a ring-like protrusion 2*b*''' situated adjacent to the joint surface 2*a* and having an outer diameter that is somewhat larger than the inner diameter of the main body 1. Formed on this ring-like protrusion 2*b*''' is a likewise ring-shaped wedge 2*f*, the tip of which is opposed to the interface between the main layer 1*a* and the sub-layer 1*b*. The protrusion 2*b*''' and the wedge 2*f* constitute a wedge means, which causes a compressive load acting in the axial direction of the joint 2 to be applied to the interface between the main layer 1*a* and the sub-layer 1*b*, thereby separating the main layer 1*a* and the sub-layer 1*b* from each other at this interface. Instead of providing a ring-shaped wedge, it is also possible to provide a plurality of wedges arranged at equal intervals along the interface between the layers. The wedge may be a single or double-faced one. However, as shown in FIGS. 8 and 9, the single-faced structure, in which the face provides an external periphery, is the more preferable. Further, it is desirable for the face to make an angle ranging from 15 to 45° with respect to the axial dimension of the main body 1.

Figure 10:
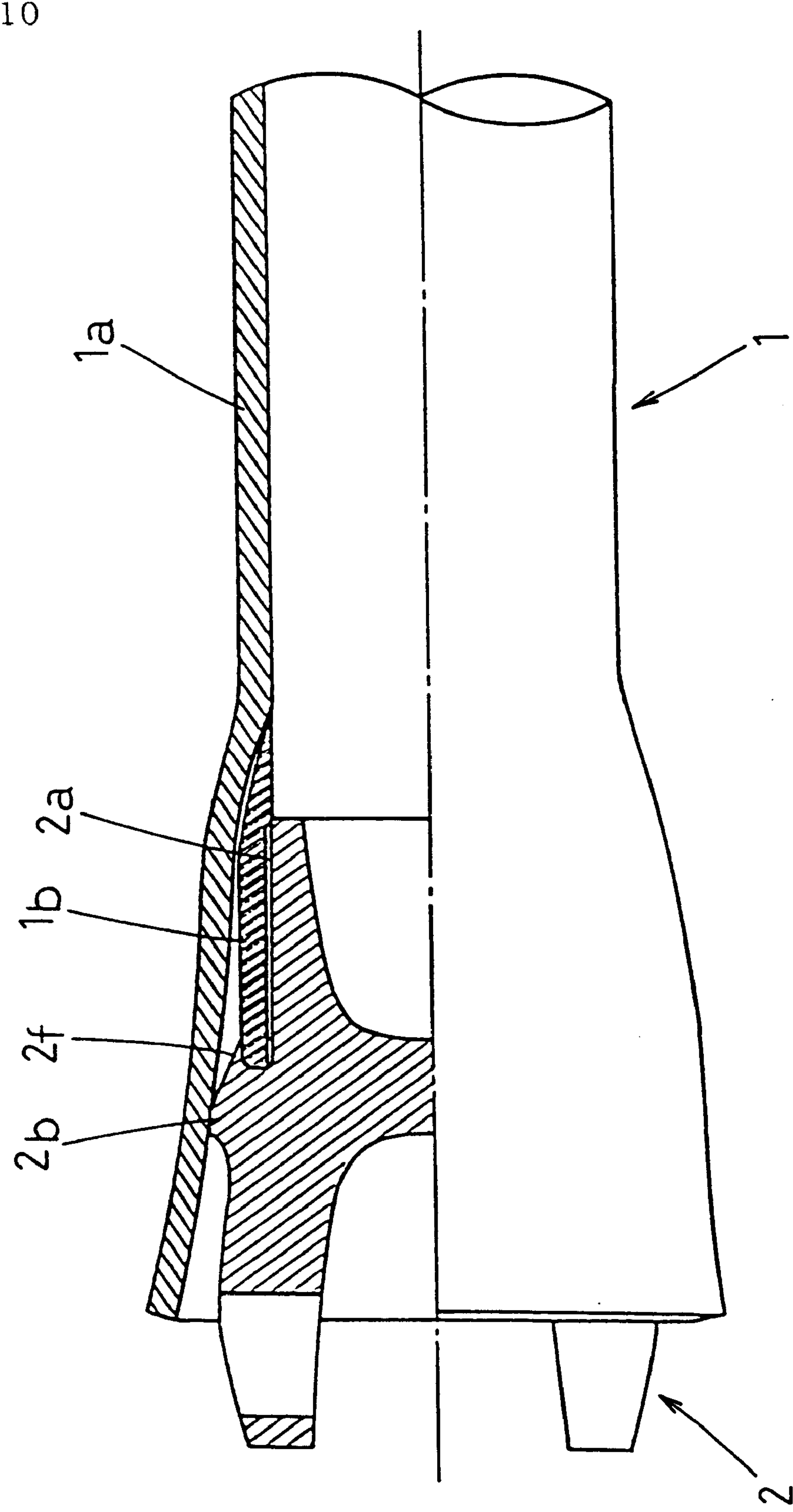
FIG. 10 is a schematic front view, partly in longitudinal section, of the essential part of the propeller shaft shown in FIG. 8, showing how rupture proceeds in the propeller shaft.

When an axial compressive load is applied to the propeller shaft described above, the joint 2 is pressed against the main body 1 as shown in FIG. 10, and the wedge 2*f* is forced into the interface between the main layer 1*a* and the sub-layer 1*b*. When the wedge 2*f* has been forced into the interface between the main layer 1*a* and the sub-layer 1*b*, a circumferential tensile strain is generated in the main layer 1*a* by its wedge effect. Since the tensile rupture ductility of the main layer la is lower than that of the sub-layer 1*b*, only the main layer la suffers rupture, and inter-layer exfoliation occurs between the main layer 1*a* and the sub-layer 1*b*. That is, the main layer 1*a* and the sub-layer 1*b* are separated from each other. Once this condition has been attained, the rupture of the main layer la proceeds rapidly. However, the sub-layer 1*b*, which is joined to the joint 2, does not rupture but moves axially through the main body 1 while destroying the main layer 1*a* with the joint 2 as it moves along.

In this way, the axial energy is absorbed through rupture of the main layer 1*a*. The initial rupture of the main body 1 is induced by the wedge 2*f* of the joint 2, and the protrusion 2*b* enlarges the main layer 1*a*. In view of this, it is desirable for the angle which the wedge 2*f* makes with the axial direction of the main body 1 to be in the range of 15~45°.

In the above-described embodiments, the main body is symmetrical about the midpoint with respect to the length dimension thereof. However, this should not be construed restrictively. For, as will be described below, it is not always necessary for the rupture of the main body to proceed simultaneously from both ends thereof. Though it depends on the method of joining the joint, etc., it is possible to adopt a construction in which one of the ends has no sub-layer.

Furthermore, the joints described above have a serration in the joint section. Such a joint can be joined to the main body more firmly, which is advantageous from the viewpoint of the transmission of torsional torque. However, this should not be construed restrictively. Although it depends on the junction method, etc., it is also possible to use a joint having no serration.

Furthermore, although it is desirable for the joint to be joined by press fitting, it is also possible to adopt a junction method in which press fitting is combined with an adhesive.

Figure 11:
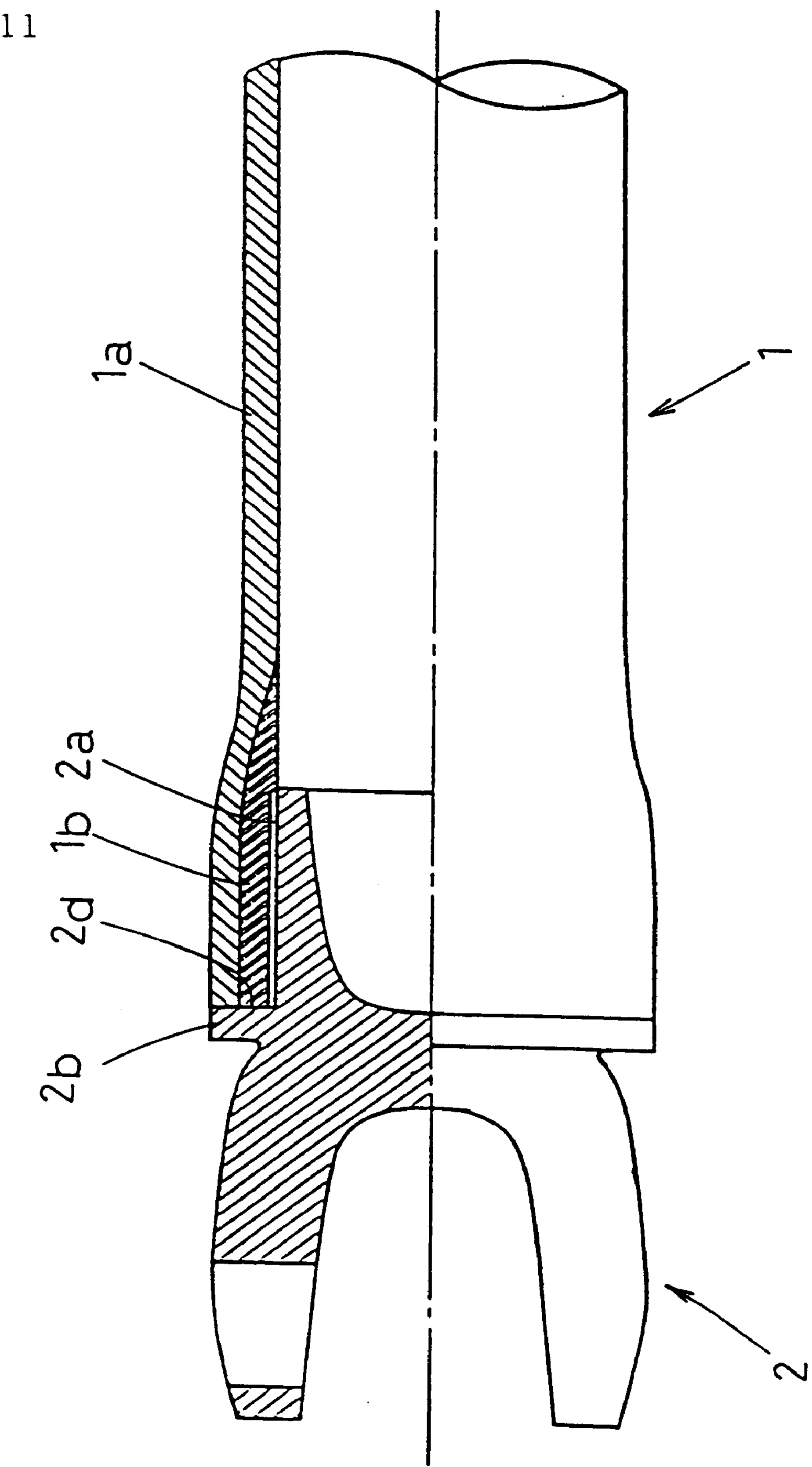
FIG. 11 is a schematic front view, partly in longitudinal section, of the essential part of a propeller shaft according to embodiment the joint that is joined to the non-broken end of the propeller shaft.

In the above-described propeller shafts, the joint that is joined to one end of the main body is the same as that joined to the other end thereof. That is, these propeller shafts are symmetrical about the midpoint with respect to the length dimension. Although this is advantageous in that the number of kinds of parts is relatively small, it is also possible to provide a joint having no compressive load transmitting section at the other end of the main body since it is not absolutely necessary for the rupture of the main body to proceed simultaneously from both ends thereof. Furthermore, as shown in FIG. 11, the joint at the other end of the main body may be formed such that, though of a configuration similar to that shown in FIG. 4 when seen as a whole, it has a protrusion 2*b*"" the outer diameter of which is not smaller than that of the main body 1, and an erect surface 2*d* formed thereby and facing the outer end surfaces of both the main layer 1*a* and the sub-layer 1*b*. In this case, the erect surface 2*d* functions as a stopper at the time of press fitting, and, further, as a seating for receiving a compressive load applied to the main body. In some cases, no joint may be joined to the other end of the main body, with a flange or the like for mounting a joint being joined thereto instead.

Figure 12:
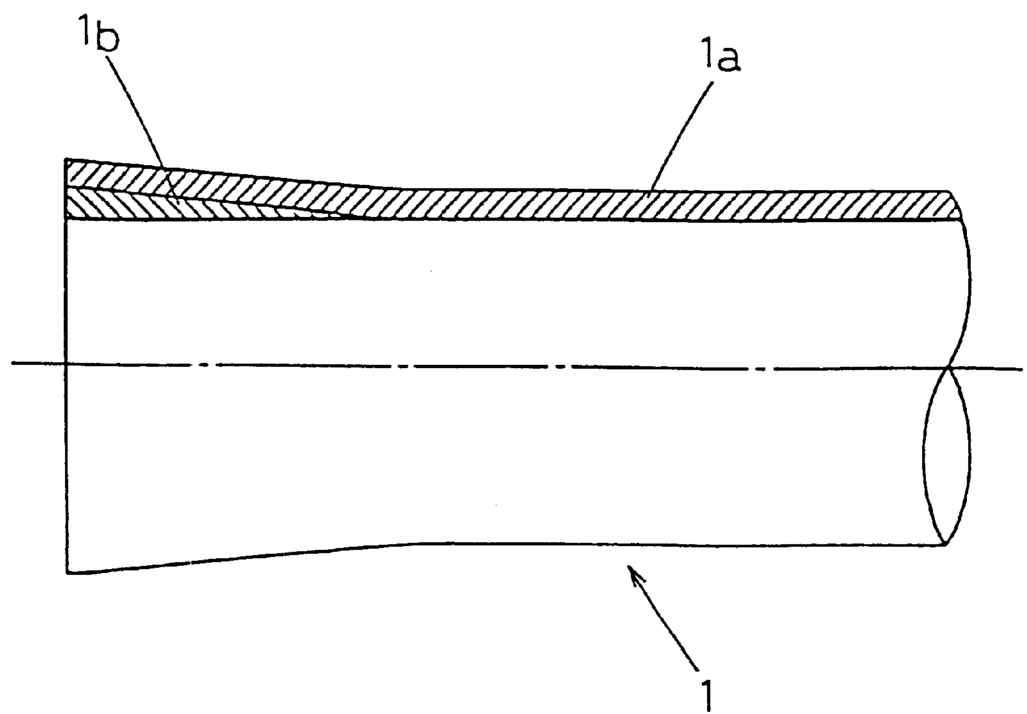
FIG. 12 is a schematic front view, partly in longitudinal section, of the essential part of a main body having a sub-layer of a different configuration.

When considered from the viewpoint of the progress of rupture in the main body described above, it is desirable for the sub-layer 1*b* to be formed such that its inner end portion, which is opposite to the outer end portion, has a wedge-shaped longitudinal-sectional configuration as shown in FIG. 1, etc. Furthermore, as shown in FIG. 12, it is also desirable for the thickness of the sub-layer to be gradually diminished from the axially outer end surface toward the axially inner end surface thereof.

Figure 13:
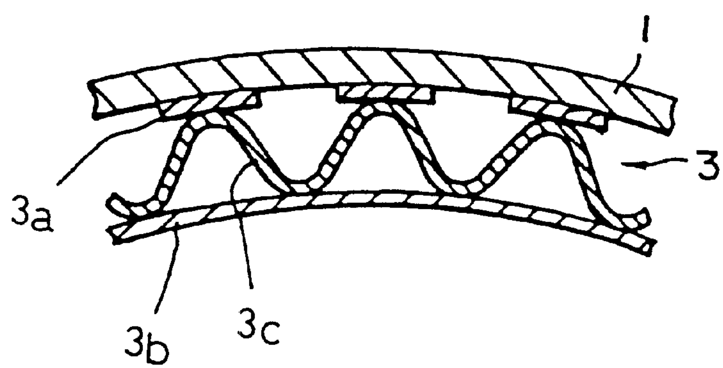
FIG. 13 is a schematic cross sectional view of the essential part of a damper used in the propeller shaft of this invention.
Figure 14:
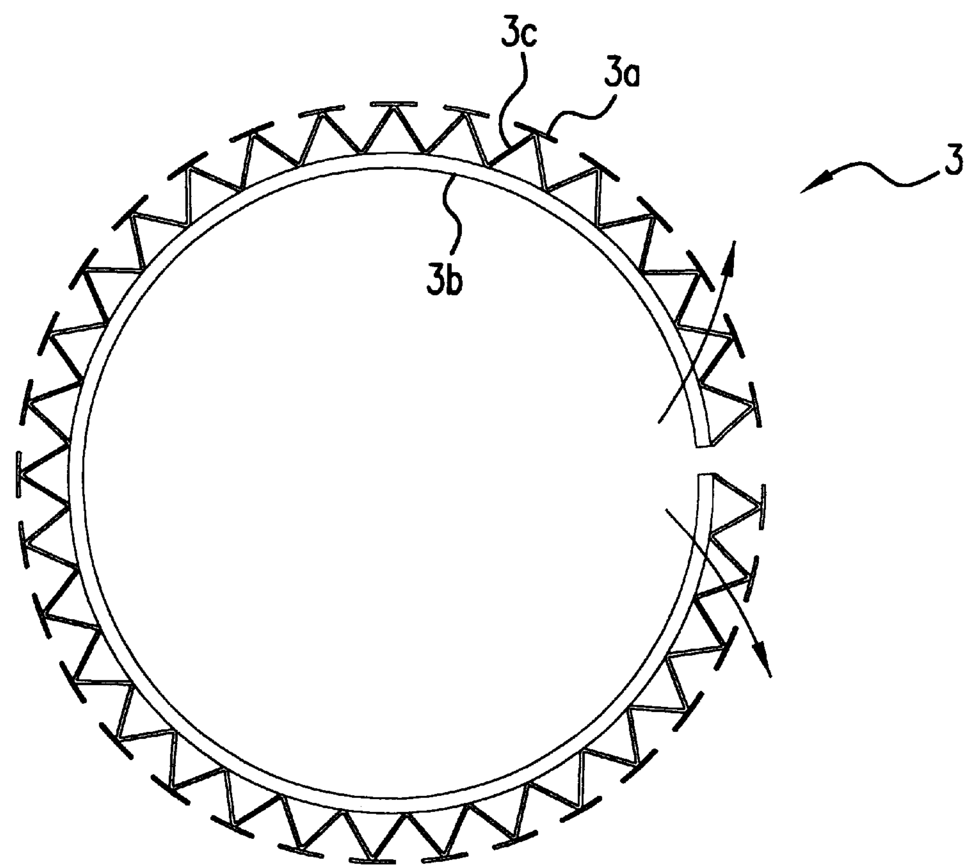
FIG. 14 is a schematic side view showing the overall configuration of the damper shown in FIG. 13.
Figure 15:
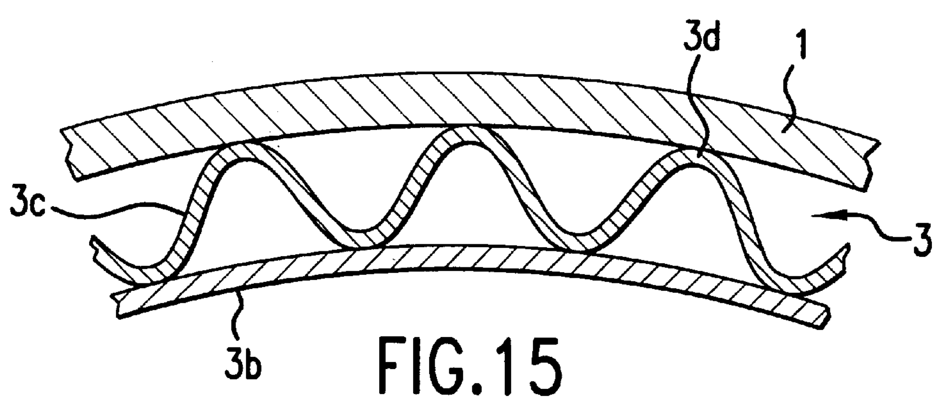
FIG. 15 is a schematic cross sectional view showing the essential part of a damper that is different from that shown in FIG. 13.

Furthermore, to restrain vibrations, noise, etc. in use over a wide frequency range, it is desirable to provide a built-in damper inside the main body. FIG. 13 shows an example of such a damper. The damper 3, which is formed of thick paper, plastic film, non woven fabric of synthetic fiber or the like, comprises a plurality of frictional engagement sections 3*a* arranged along the inner peripheral surface of the main body 1, a cylindrical holding section 3*b* spaced apart from the inner peripheral surface of the main body 1, and an elastic support section 3*c* of a corrugated type which resiliently supports the frictional engagement sections 3*a* by pressing them against the inner peripheral surface of the main body 1. As shown in FIG. 14, when seen as a whole, the damper is formed as a cylindrical body having a tendency to expand in the directions indicated by the arrows. The damper is incorporated into the main body such that the frictional engagement sections 3*a* are held slidable on and pressed against the inner peripheral surface of the main body 1 by the elastic support section 3*c*. FIG. 15 shows another example of the damper. In this damper 3, the apex sections 3*d* of the corrugated-type elastic support section 3*c* also function as the frictional engagement sections 3*a* in the damper shown in FIGS. 13 and 14.

EXAMPLE 1

The main body was formed by the filament winding method. That is, six bundles of carbon fibers (average single fiber diameter: 7m$\mu$, number of single fibers: 12,000, tensile strength: 360 kgf/mm2, tensile elastic modulus: 23,500 kgf/mm2) were properly arranged and impregnated with bisphenol-A-type epoxy resin containing curing agent and curing accelerator, and, in so doing, the bundles were wound on a mandrel having an outer diameter of 70 mm and a length of 1,300 mm. Firstly, eight layers were wound on one end section of a length of 100 mm so as to be at an angle of ±80° with respect to the axial dimension to thereby form a sub-layer having a thickness of 2.5 mm. After this, the procedure moved to the other end to form a similar sub-layer on the other end section, and then four layers were wound over the entire length of the mandrel at an angle of ±15° with respect to the axial dimension to thereby form a main layer having a thickness of 2.5 mm. Further, one layer was hooped over the entire length of the mandrel at an angle of −80° with respect to the axial dimension.

Next, epoxy resin was heated at a temperature of 180° C. for 6 hours to thereby cure the epoxy resin while rotating the mandrel. Then, the mandrel is drawn out, and each end portion of an extension of 50 mm was cut off and removed, whereby a main body 1 as shown in FIG. 1 was obtained, which had an end-portion outer diameter of 80 mm, a sub-layer outer diameter of 75 mm, an inner diameter of 70 mm, and a length of 1,200 mm.

Next, a metal joint 2 as shown in FIG. 2, whose joint surface 2*a* had a serration, an outer diameter of 70.5 mm, and a length of 40 mm, whose protrusion 2*b* had an outer diameter of 80 mm, and whose slope 2*c* made an angle of 30° with respect to the axial dimension of the main body 1, was joined to each end of the above main body 1 by press fitting to thereby obtain a propeller shaft according to this invention as shown in FIG. 1. The requisite force for the press fitting was 7,000 kgf.

Subsequently, the propeller shaft was subjected to a torsion test. The torsional strength of the propeller shaft was found to be 350 kgf.m, and the critical revolution 8,000 rpm, both of which proved sufficient as a propeller shaft for automobiles.

Figure 3:
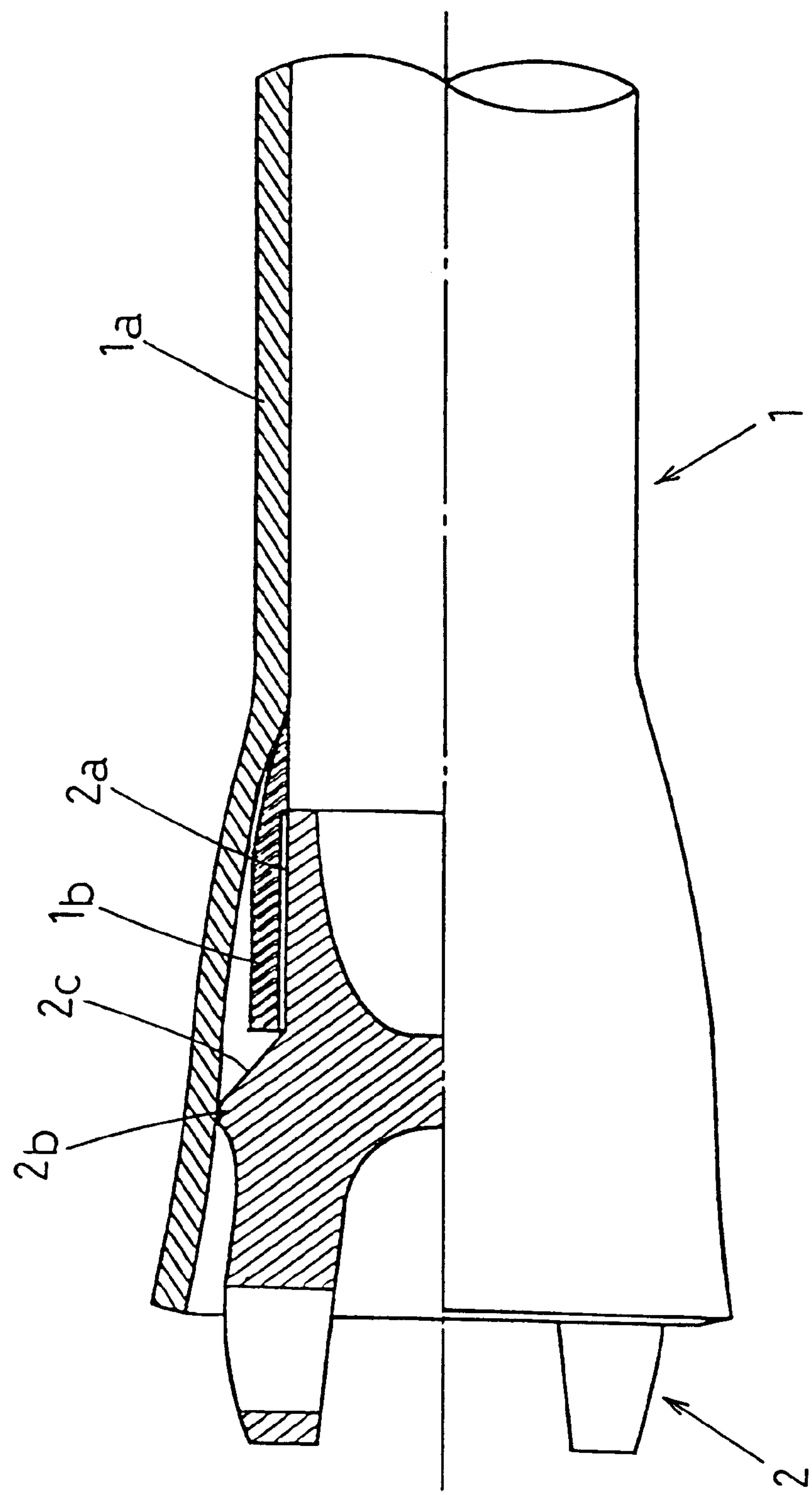
FIG. 3 is a schematic front view, partly in longitudinal section, of the essential part of the propeller shaft shown in FIG. 1, showing how rupture proceeds in the propeller shaft.

When an axial compressive load was applied to the propeller shaft, the main layer and the sub-layer were separated from each other at 10,000 kgf to thereby start rupture of the main layer. After the rupture, sequential rupture as shown in FIG. 3 took place at a load of 3,000 kgf.

EXAMPLE 2

A propeller shaft as shown in FIG. 4 was obtained in the same manner as in.Example 1 except that a joint was used the protrusion 2*b* of which had an outer diameter of 75 mm, which was the same as that of the sub-layer 1*b*.

In a torsion test, the propeller shaft was found to have a torsional strength of 350 kgf.m and a critical revolution of 8,000 rpm, both of which proved satisfactory for a propeller shaft for automobiles.

Next, when an axial compressive load was applied, the main layer and the sub-layer were separated from each other at 11,000 kgf, and the rupture of the main layer started. After the rupture, sequential breakage proceeded at a load of 3,500 kgf as shown in FIG. 6.

EXAMPLE 3

A metal joint 2 as shown in FIG. 9, which had a serration on the joint surface, whose joint surface 2*a* had an outer diameter of 70.5 mm and an length of 40 mm, whose protrusion 2*b* had an outer diameter of 80 mm, and whose wedge 2*f* made an angle of 30° with respect to the axial dimension of the main body 1, was joined to each end of the main body 1 by press fitting, thereby obtaining a propeller shaft according to this invention as shown in FIG. 8. The requisite force for the press fitting was 7,000 kgf.

In a torsion test, the above propeller shaft was found to have a torsional strength of 350 kgf.m and a critical revolution of 8,000 rpm, both of which proved satisfactory for a propeller shaft for use in automobiles.

Next, when an axial compressive load was applied, the separation of the main layer and the sub-layer occurred at 10,000 kgf to start the rupture of the main layer. After the rupture, sequential breakage proceeded at a load of 3,000 kgf as shown in FIG. 10.

INDUSTRIAL APPLICABILITY

The propeller shaft of this invention is equipped with a compressive load transmitting section which concentrates a compressive load acting in the axial direction of the joint on the interface between the main layer and the sub-layer to thereby separate the main layer and the sub-layer from each other. Thus, as shown with reference to the embodiments, it is possible, at the time of collision, to allow the rupture of the propeller shaft to proceed reliably with the rupture of the car body while satisfying the fundamental requirements for the car, such as the torsional strength and the critical revolution, thereby enabling the energy absorbing effect due to the crashable body structure to be exerted to a sufficient degree.

What is claimed is:

1. A propeller shaft comprising a cylindrical main body made of fiber-reinforced plastic and a first joint having serrations on an outer engaging surface thereof and made of metal that is joined by press fitting said outer engaging surface into an end of said main body, said main body comprising a main layer extending over the entire length of said main body and a sub-layer formed at an end of said main body so as to be formed integrally with and internally of said main layer, said joint comprising a compressive load transmitting section configured to concentrate a load onto said sub-layer to thereby separate said main layer and said sub-layer from each other at an interface between said main layer and said sub-layer upon the application of a force in excess of a predetermined axial force.

2. A propeller shaft according to claim 1, further comprising a joint that is joined to another end of said main body.

3. A propeller shaft according to claim 2, wherein said main layer comprises helically wound reinforcing fibers and portions of said sub-layer formed at said one end and said another end of said main body so as to be formed integrally with and internally of said main layer and comprise hooped reinforcing fibers.

4. A propeller shaft according to claim 3, wherein said reinforcing fibers of said main layer are helically wound at an angle of ±5~30° with respect to an axial dimension of said main body.

5. A propeller shaft according to one of claims 1–4, wherein said compressive load transmitting section has a sloped portion descending toward the junction between said first joint and said sub-layer.

6. A propeller shaft according to one of claims 1–4, wherein said compressive load transmitting section has an erect surface having an outer diameter not larger than the outer diameter of said sub-layer and opposed to an outer end surface of said sub-layer.

7. A propeller shaft according to claim 6, wherein said erect surface extends in a ring-like fashion around the circumference of said first joints.

8. A propeller shaft according to claim 7, wherein the outer end surface of said main body is partially beveled.

9. A propeller shaft according to any one of claims 1–4, wherein said compressive load transmitting section includes a plurality of erect surfaces arranged around the circumference of the joint joined to said one end of said main body and having outer diameters not larger than the outer diameter of said sub-layer.

10. A propeller shaft according to any one of claims 1–4, said compressive load transmitting section comprising wedge means for causing a compressive load acting in the axial direction of said joint to act on an interface between said main layer and said sub-layer to thereby separate said main layer and said sub-layer from each other upon said application of a predetermined axial force.

11. A propeller shaft according to claim 10, wherein said wedge means comprises a ring-like wedge extending along a circular line that is defined by the interface between said main layer and said sub-layer at an end of said main body.

12. A propeller shaft according to claim 10, wherein said wedge means comprises a plurality of wedges extending along a circular line that is defined by the interface between said main layer and said sub-layer at an end of said main body.

13. A propeller shaft according to one of claims 1–4, wherein said main body further comprises a damper comprising a plurality of frictional engagement sections arranged along an inner peripheral surface of the main body, a cylindrical holding portion spaced apart from the inner peripheral surface of the main body and an elastic support section which resiliently supports the frictional engagement sections.

* * * * *